(12) United States Patent
Leudet de la Vallee

(10) Patent No.: US 10,584,498 B2
(45) Date of Patent: Mar. 10, 2020

(54) FLOOR PANELS

(71) Applicant: Tarkett Inc., Farnham, Quebec (CA)

(72) Inventor: Stephane Leudet de la Vallee, Sandy Springs, GA (US)

(73) Assignee: TARKETT INC., Farnham, Quebec ( * ) Notice: Subject to any disclaimer, the term of this patent is extended or adjusted under 35 U.S.C. 154(b) by 0 days.

(21) Appl. No.: 15/710,636

(22) Filed: Sep. 20, 2017

(65) Prior Publication Data
US 2018/0080231 A1  Mar. 22, 2018

Related U.S. Application Data

(60) Provisional application No. 62/397,259, filed on Sep. 20, 2016.

(51) Int. Cl.
E04F 15/02 (2006.01)
E04F 15/22 (2006.01)
(Continued)

(52) U.S. Cl.
CPC .......... *E04F 15/02038* (2013.01); *B32B 3/06* (2013.01); *B32B 5/18* (2013.01); *B32B 7/12* (2013.01); *B32B 27/065* (2013.01); *B32B 27/12* (2013.01); *B32B 27/304* (2013.01); *E04F 15/107* (2013.01); *E04F 15/22* (2013.01); *E04F 15/225* (2013.01); *B32B 2255/10* (2013.01); *B32B 2255/28* (2013.01);
(Continued)

(58) Field of Classification Search
CPC . E04F 15/02038; E04F 15/107; E04F 15/225; B32B 5/18
See application file for complete search history.

(56) References Cited

U.S. PATENT DOCUMENTS 3,771,787 A * 11/1973 Wood, Jr. ............... A63C 19/00
428/314.4
4,967,529 A   11/1990 L'Heureux
(Continued)

OTHER PUBLICATIONS

DirectWoodFlooring.com, "Hartco Urethane Parquet Foam-Backing Floors" 2 pages (Sep. 30, 2016) http://www.directwoodflooring.com/hardwood_flooring/hardwood_flooring_display_series.asp?mID=29&cID=57&sID=105.
(Continued)

*Primary Examiner* — Joshua K Ihezie
(74) *Attorney, Agent, or Firm* — Winston & Strawn LLP

(57) ABSTRACT

A floor panel having a foam pad and a laminated surface is contemplated. The foam pad includes a plurality of male and female fastening mechanisms. The laminated surface is attached to the foam pad and exposed to foot traffic. The panel is configured to be installed on an installation surface and interconnect with additional floor panels via the male and female fastening mechanisms to form a sports floor for a sports activity. Interconnections between the panel and the additional panels have no gaps or gaps small enough without interfering the sports activity. The panel is configured to be removable from the installation surface by disengaging the male and female fastening mechanisms interconnected with the additional floor panels. The panels can be easily installed and removed and have improved shock absorbency. The panels are portable and have a simple structure that aids in manufacturing, reduces cost, and are easy to clean.

17 Claims, 7 Drawing Sheets

(51) Int. Cl.
  *B32B 3/06* (2006.01)
  *B32B 27/12* (2006.01)
  *B32B 7/12* (2006.01)
  *B32B 27/06* (2006.01)
  *B32B 27/30* (2006.01)
  *B32B 5/18* (2006.01)
  *E04F 15/10* (2006.01)

(52) U.S. Cl.
  CPC ... *B32B 2262/101* (2013.01); *B32B 2266/025* (2013.01); *B32B 2307/56* (2013.01); *B32B 2307/718* (2013.01); *B32B 2307/72* (2013.01); *B32B 2307/746* (2013.01); *E04F 2201/0138* (2013.01); *E04F 2201/021* (2013.01)

(56) References Cited

U.S. PATENT DOCUMENTS

| | | | |
|---|---|---|---|
| 5,943,775 A * | 8/1999 | Lanahan | B26D 1/553 264/142 |
| 5,952,076 A * | 9/1999 | Foster | B32B 27/32 428/215 |
| 6,256,959 B1 * | 7/2001 | Palmersten | E04B 1/86 181/292 |
| 7,614,197 B2 | 11/2009 | Nelson | |
| 8,291,661 B2 * | 10/2012 | Bengry | E04F 15/02 52/390 |
| 9,085,909 B2 | 7/2015 | Kanter | |
| 2006/0266713 A1 * | 11/2006 | Gearhart | B29B 13/023 210/767 |
| 2010/0031599 A1 * | 2/2010 | Kennedy | E04B 5/02 52/583.1 |
| 2012/0011793 A1 * | 1/2012 | Clark | E04C 3/122 52/309.4 |
| 2013/0232898 A1 * | 9/2013 | Fearon | E04F 15/181 52/302.1 |
| 2015/0024150 A1 * | 1/2015 | Vachon | A63C 19/12 428/17 |
| 2015/0284965 A1 * | 10/2015 | Hurson | E04F 15/02038 52/588.1 |
| 2015/0343739 A1 * | 12/2015 | Pervan | B32B 5/30 52/582.1 |
| 2016/0032597 A1 * | 2/2016 | Keane | E04F 15/166 52/309.9 |
| 2016/0083965 A1 * | 3/2016 | Baert | E04F 13/18 52/309.15 |
| 2016/0177578 A1 | 6/2016 | Ramachandra | |

OTHER PUBLICATIONS

Splicd, "Futsal Flooring System, Removable Recycled Polypropylene Modular Sports Flooring for Futsal of sportsflooring" 4 pages (Sep. 30, 2016) https://www.splicd.com/wholesale/pz5578e04-cz5df48e0-futsal-flooring-system-removable-recycled-polypropylene-modular-sports-flooring-for-futsal.html.

* cited by examiner

FLOOR PANELS

CROSS-REFERENCE TO RELATED APPLICATIONS

This application claims the benefit of U.S. Provisional Application 62/397,259, filed on Sep. 20, 2016, the entirety of which is herein incorporated by reference.

FIELD OF THE INVENTION

Embodiments of the present invention relate to floor panels. More particularly, the embodiments relate to indoor floor panels that include a foam pad and a laminated surface. The panels are easily installed in and removed from a facility and have improved shock absorbency.

BACKGROUND OF THE INVENTION

Wood strip flooring is often permanently installed in some sporting facilities that are dedicated to hosting basketball games, volleyball games, and other activities that are compatible with the wood strip playing surface. Wood strip flooring is durable, sound, and resilient. These characteristics enable the floor to absorb some of the shock of a participant's weight and in the case of basketball, the pounding of the ball, giving the floor a natural, lively feel that is unique to wood flooring and preferred by many athletics.

There are, however, a number of facilities that are designed to host a multitude of different activities that demand different floor layouts. Although the aforementioned permanent wood flooring system would be suitable for some events such as basketball games, it would not be suitable for volleyball, dodge ball, handball, and other games. Such facilities rely instead on temporary flooring systems that are suited for the particular type of event being hosted and which can be laid down and taken up fairly quickly and easily.

Temporary flooring systems present a particular challenge because not only must they be designed for quick installation and removal, they must still meet the rigorous playability standards of a permanent wood strip flooring and sports events for which the system is constructed. When installed, temporary flooring system must demonstrate the same or better soundness, firmness, coefficient of friction, and shock absorbency exhibited in permanent wood strip floors so the sports event for the which the system is constructed can be conducted on the temporary flooring system as if it is conducted on a permanent wood strip floor. Temporary flooring system should also be made of inexpensive materials and has a simple structure that reduces manufacturing cost.

It is therefore an object of the present invention to overcome these and other issues associated with conventional temporary flooring systems. In consequence of this, the present embodiments of the invention now provide such a novel solution to this problem, and others evident to those of ordinary skill in the art, and as such, satisfy the need of extending the versatility and performance of temporary flooring systems. These and other objects will become apparent to one of ordinary skill in the art in light of the specification, claims, and drawings appended hereto.

SUMMARY OF THE INVENTION

In accordance with principles of the present invention, a floor panel comprising a foam pad and a laminated surface is contemplated. The foam pad includes a plurality of male and female fastening mechanisms. The laminated surface is attached to the foam pad and exposed to foot traffic. The floor panel is configured to be installed on an installation surface and interconnect with additional floor panels via the male and female fastening mechanisms to form a sports floor for a sports activity. Interconnections between the floor panel and the additional panels have no gaps or gaps small enough without interfering the sports activity. The floor panel is further configured to be removable from the installation surface by disengaging the male and female fastening mechanisms interconnected with the additional floor panels.

In one embodiment, the foam pad is made of polypropylene, expanded polypropylene (EPP), a material that has performance or characteristics similar to polypropylene or expanded polypropylene, or a combination thereof.

In one embodiment, the laminated surface is a polyvinyl chloride (PVC) tile. The laminated surface may be glued to the foam pad.

In one embodiment, the floor panel is configured to be installed on the installation surface without applying adhesive and cement between the floor panel and the installation surface.

In one embodiment, the floor panel is configured to be installed on the installation surface without employing a fastener to fix the floor panel to the installation surface.

In one embodiment, the floor panel exhibits a force reduction above 50% per testing method found within EN 14904 or ASTM F2772. The foam pad may also exhibit a force reduction above 50% per testing method found within EN 14904 or ASTM F2772.

In one embodiment, the floor panel weighs approximately 26 lbs or less and has a density approximately 4.6 lb/ft$^3$.

In one embodiment, the floor panel further comprises intermediate layers include a non-woven fiberglass grid.

In one embodiment, the floor panel is further configured to be solid and impermeable.

In one embodiment, the laminated surface further includes a flooring design and an embossed surface. The flooring design resembles standard wood strip flooring in size, color, board length, and grain appearance.

In one embodiment, the laminated surface further includes a clear layer of PVC and a UV cured urethane treatment.

In one embodiment, the laminated surface is in physical contact with the foam pad.

In one embodiment, the foam pad serves as an underlayment or shock absorbency pad of the floor panel.

In one embodiment, the laminated surface has a coefficient of friction that meets coefficient of friction requirement of the sports activity.

In one embodiment, the floor panel has a shock absorbency that meets shock absorbency requirement of the sports activity. The floor panel may be an indoor panel.

In one embodiment, the male and female fastening mechanisms are disposed on the perimeter of the foam pad.

Figure 1:
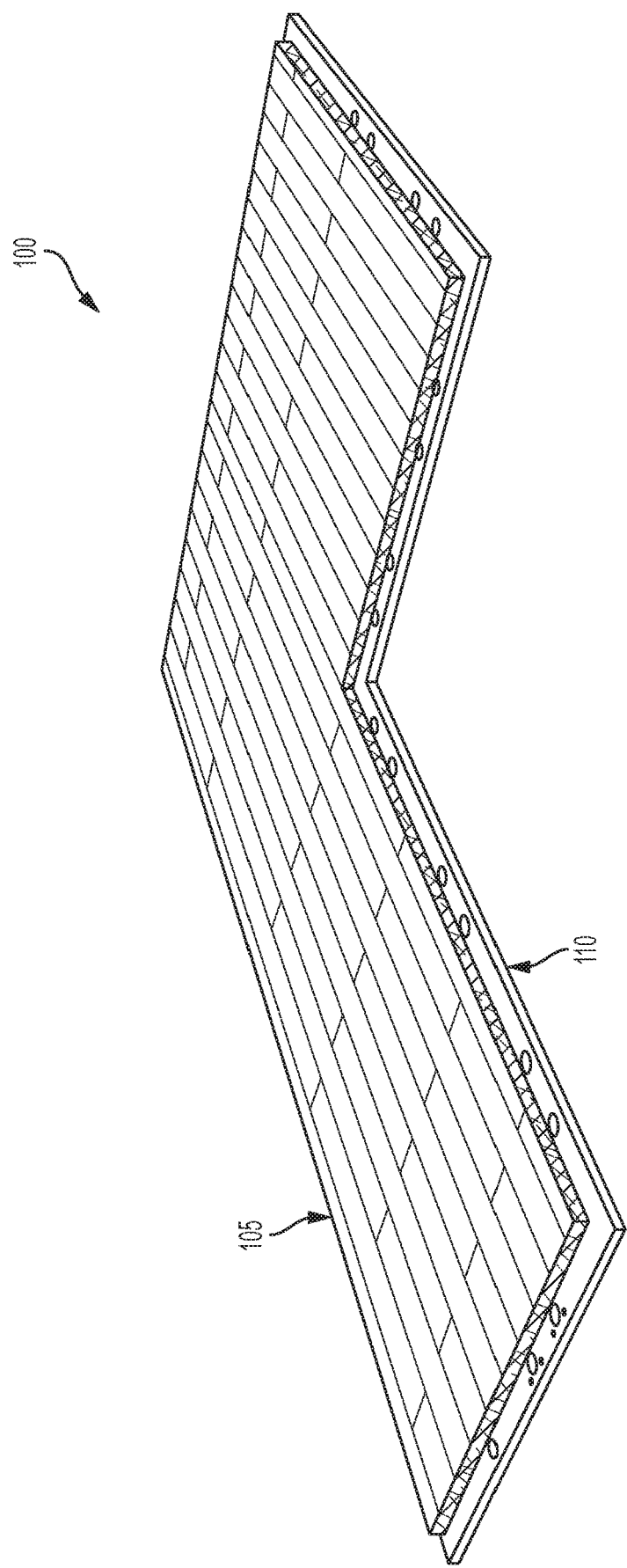
FIG. 1 illustrates one embodiment of the floor panel comprising a polypropylene foam pad and a PVC tile in accordance with some embodiments of the present invention.

The components in the figures are not necessarily drawn to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE INVENTION

An indoor sports flooring system is contemplated that involves removable panels that are easily removed from and installed in a facility. Panels can be installed for temporary or permanent use. Panels are portable and have a simple structure that aids in manufacturing, reduce cost, and is easy to clean. Panels also have improved shock absorbency compared to conventional indoor floor panels.

For example, as shown in FIG. 1, floor panel 100 comprising of a foam pad 110 and a laminated surface 105 is contemplated. The foam pad 110 serves as a shock absorbing pad and is preferably made of polypropylene, expanded polypropylene (EPP), a material that has performance or characteristics similar to polypropylene or expanded polypropylene, or a combination thereof. The foam pad 110 or the complete floor panel 100 provides exceptional force reduction (also known as shock absorption) values regardless of whether or not the complete floor panel construction includes a laminated surface. Testing has shown force reduction results above 50% per typical national and international testing methods found within EN 14904 and/or ASTM F2772. This shock absorption feature can be modified or change with varying laminated surface options and/or foam pad construction. The foam pad 110 (base layer) may also be described as the "underlayment".

The laminated surface 105 may be a polyvinyl chloride (PVC) tile or a tile made of other suitable flooring material (e.g., vinyl, linoleum, rubber, and/or synthetic turf). The laminated surface 105 is attached to the pad 110 by an adhesive film, a bonding application depending on temperature or pressure, or a mechanical interlocking mechanism. The attachment may be temporary or permanent. In one embodiment, the foam pad 110 may be a polypropylene foam pad and the laminated surface 105 may be a PVC tile.

The polypropylene foam pad 110 may comprise a plurality of male and female fastening mechanisms disposed on the perimeter or a portion of the perimeter of the pad 110 for interlocking adjacent floor panels. The male fastening mechanism is a mechanism that can be inserted into the female fastening mechanism such as a protrusion. The female fastening mechanism may be a hole, opening, or hollow section configured to receive the protrusion. The polypropylene foam pad 110 may have a rectangular shape or other shape. When the polypropylene foam pad 110 has a rectangular shape, the male fastening mechanisms are disposed on two adjacent sides of the pad 110 and the female fastening mechanisms are disposed on the other two adjacent sides of the pad 110. The polypropylene foam pad 110 is preferably solid (i.e., not hollow or containing spaces, holes, or gaps) and impermeable. The polypropylene foam pad 110 serves as an underlayment or shock pad of the floor panel. The PVC tile 105 or other tile may be embossed and colored to resemble wood. The combination of the foam pad 110 and the PVC tile 105 (the floor panel) is also preferably solid and impermeable. Once the floor panels are interconnected, the floor panels may also be disconnected from each other by disengaging the male and female fastening mechanisms. As such, the installed floor panels can be separated and removed from the installation surface in a location and be transported to and reused on another installation surface in another location. The floor panels are installed on an installation surface without applying adhesive (e.g., glue) or binder (e.g., cement) between the floor panel and the installation surface and/or without employing a fastener (e.g., screw, nail, pin, staple, etc.) to fix the floor panels to the installation surface. In some embodiments, adhesive, binder, and/or fastener may be utilized.

Figure 2:
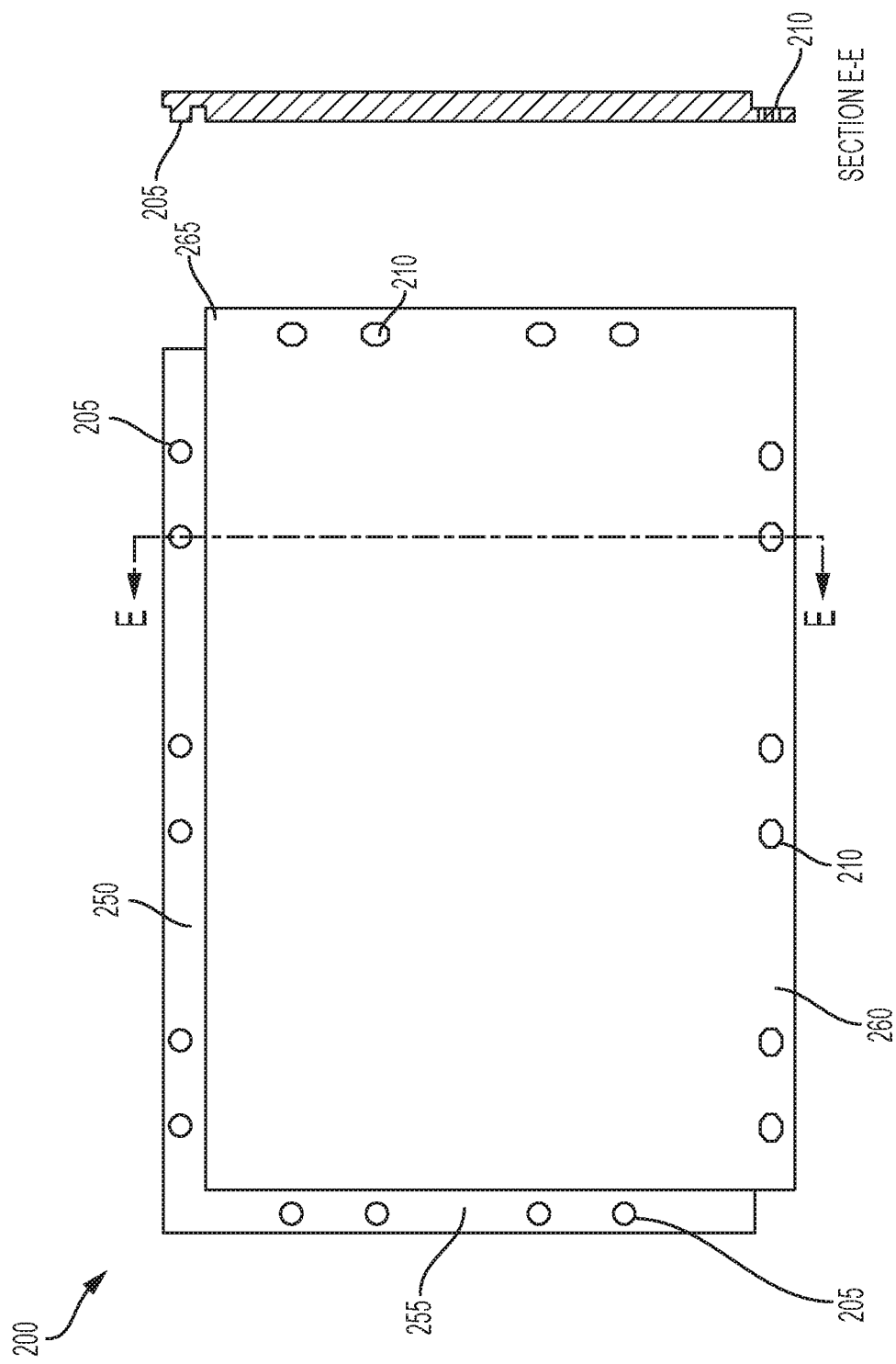
FIG. 2 illustrates a polypropylene foam pad including a plurality of male and female fastening mechanisms disposed on the perimeter or a portion of the perimeter of the pad for interlocking adjacent floor panels in accordance with some embodiments of the present invention.

FIG. 2 illustrates a polypropylene foam pad 200 having a plurality of male 205 and female 210 fastening mechanisms. The male 205 and female 210 fastening mechanisms are disposed on the perimeter or a portion of the perimeter of the pad 110 for interlocking adjacent floor panels. The polypropylene foam pad 200 has a rectangular shape, and the male fastening mechanisms 205 are disposed on two adjacent sides 250, 255 of the pad 200 and the female fastening mechanisms 210 are disposed on the other two adjacent sides 260, 265 of the pad 200. In some embodiments, male fastening mechanisms 205 may be female fastening mechanisms and female fastening mechanisms 210 may be male fastening mechanisms.

Figure 3:
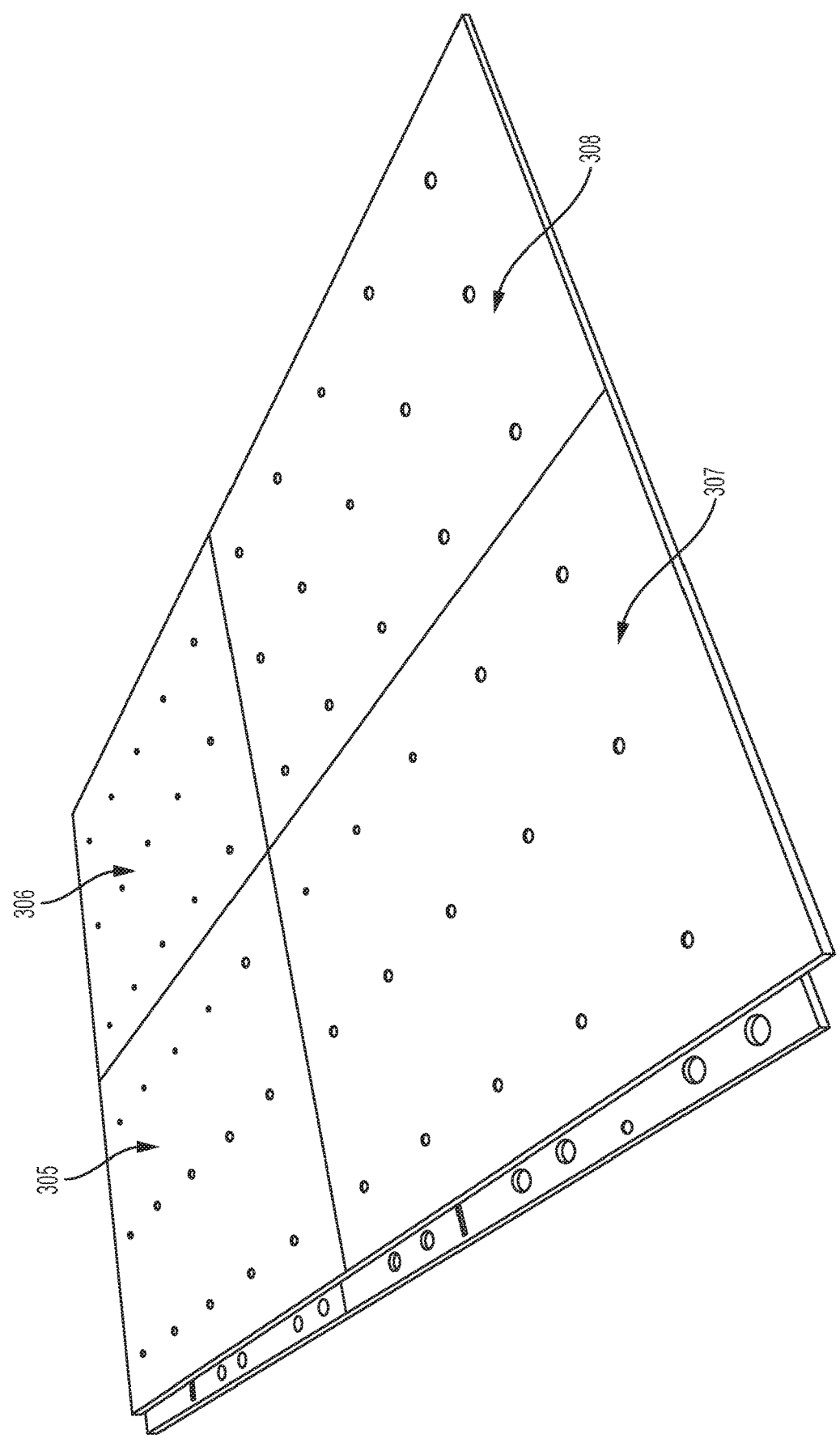
FIG. 3 illustrates four polypropylene foam pads connected together in accordance with some embodiments of the present invention.
Figure 4:
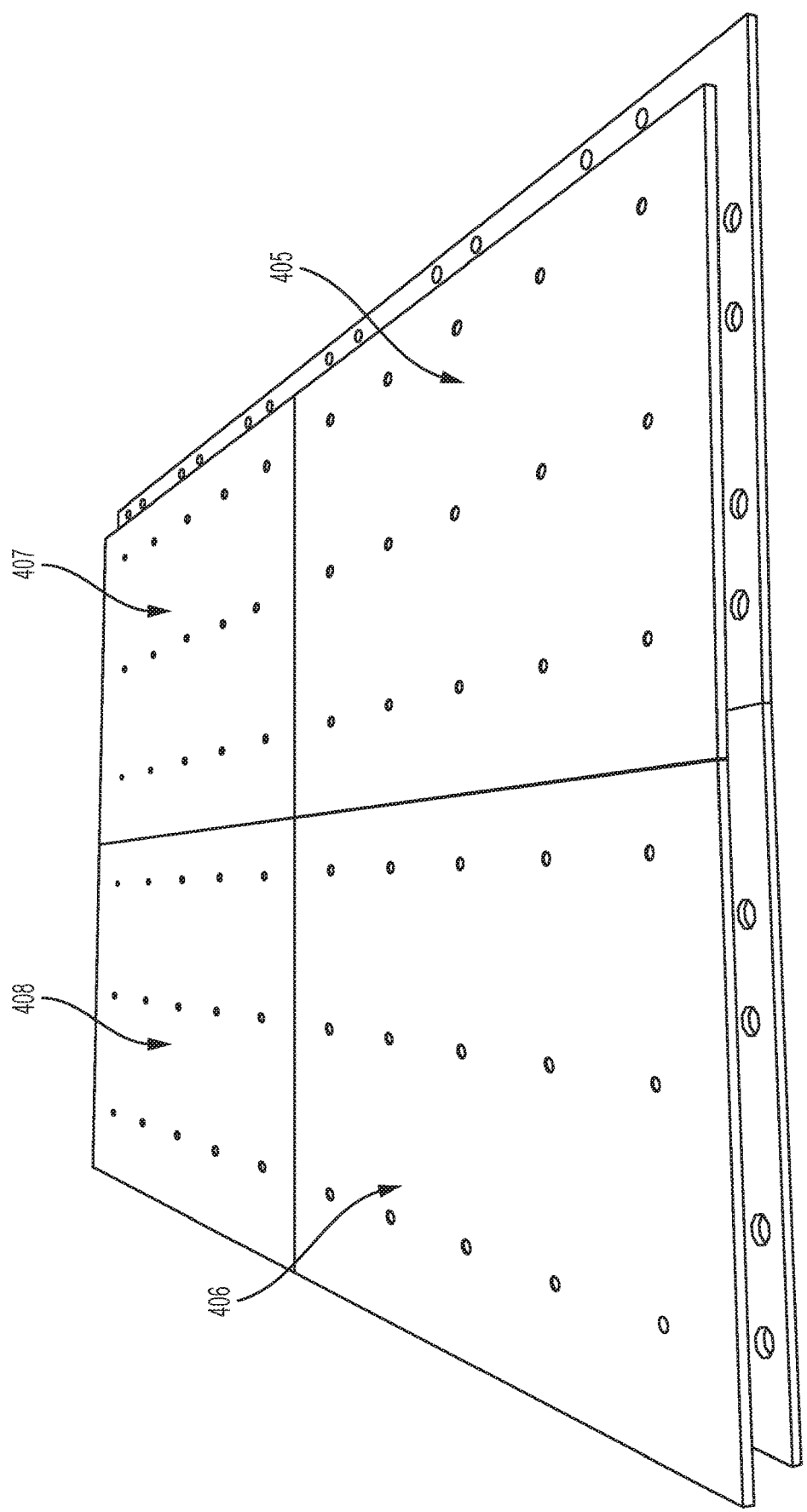
FIG. 4 illustrates another view of the four connected polypropylene foam pads shown in FIG. 3 in accordance with some embodiments of the present invention.

FIG. 3 illustrates a plurality of polypropylene foam pads 305-308 interconnected via their male and female fastening mechanisms. FIG. 4 illustrates another view of the interconnected polypropylene foam pads 305-308 shown in FIG. 3.

Figure 5:
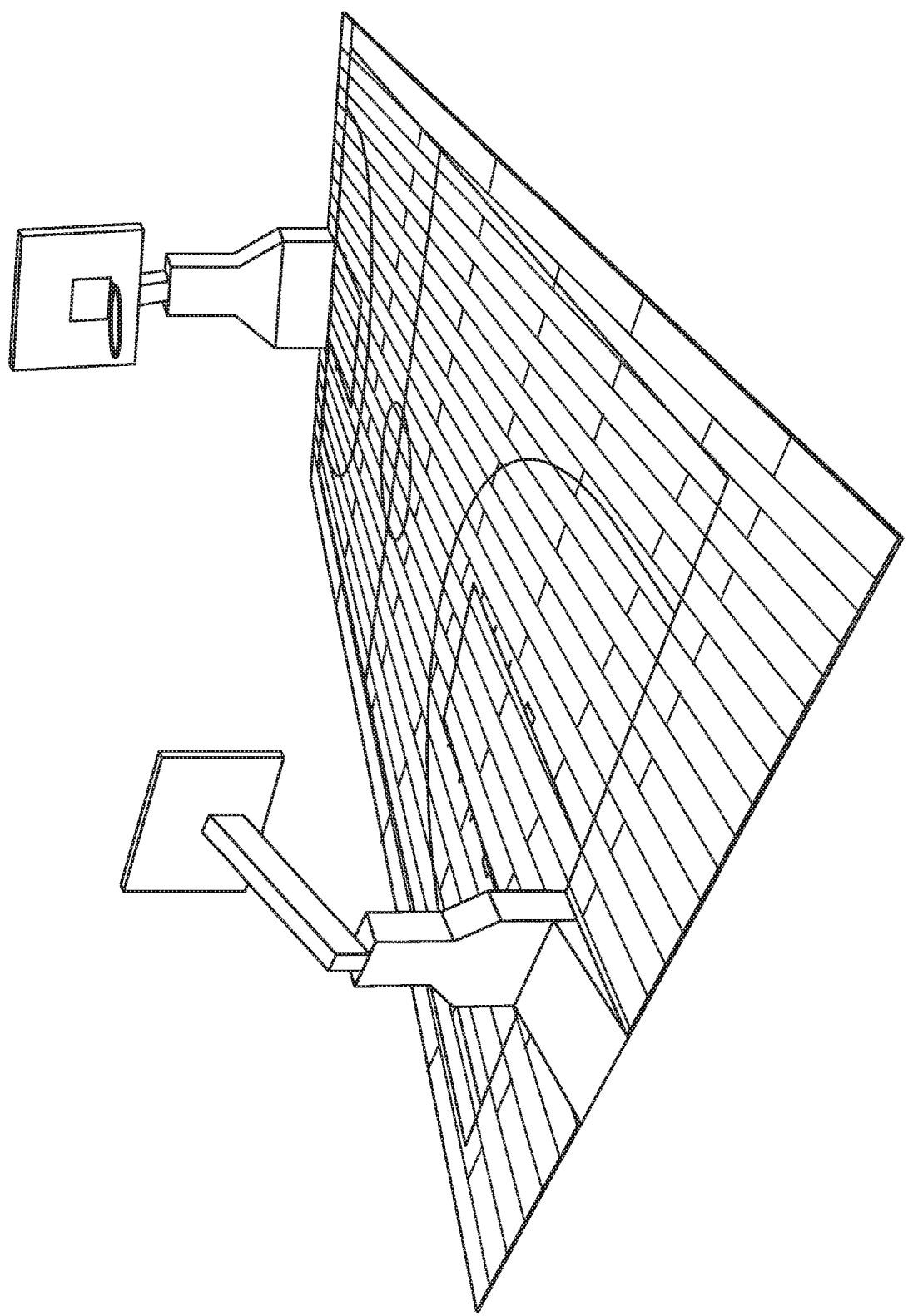
FIG. 5 illustrates an example real basketball court built with the floor panels in accordance with some embodiments of the present invention.
Figure 6:
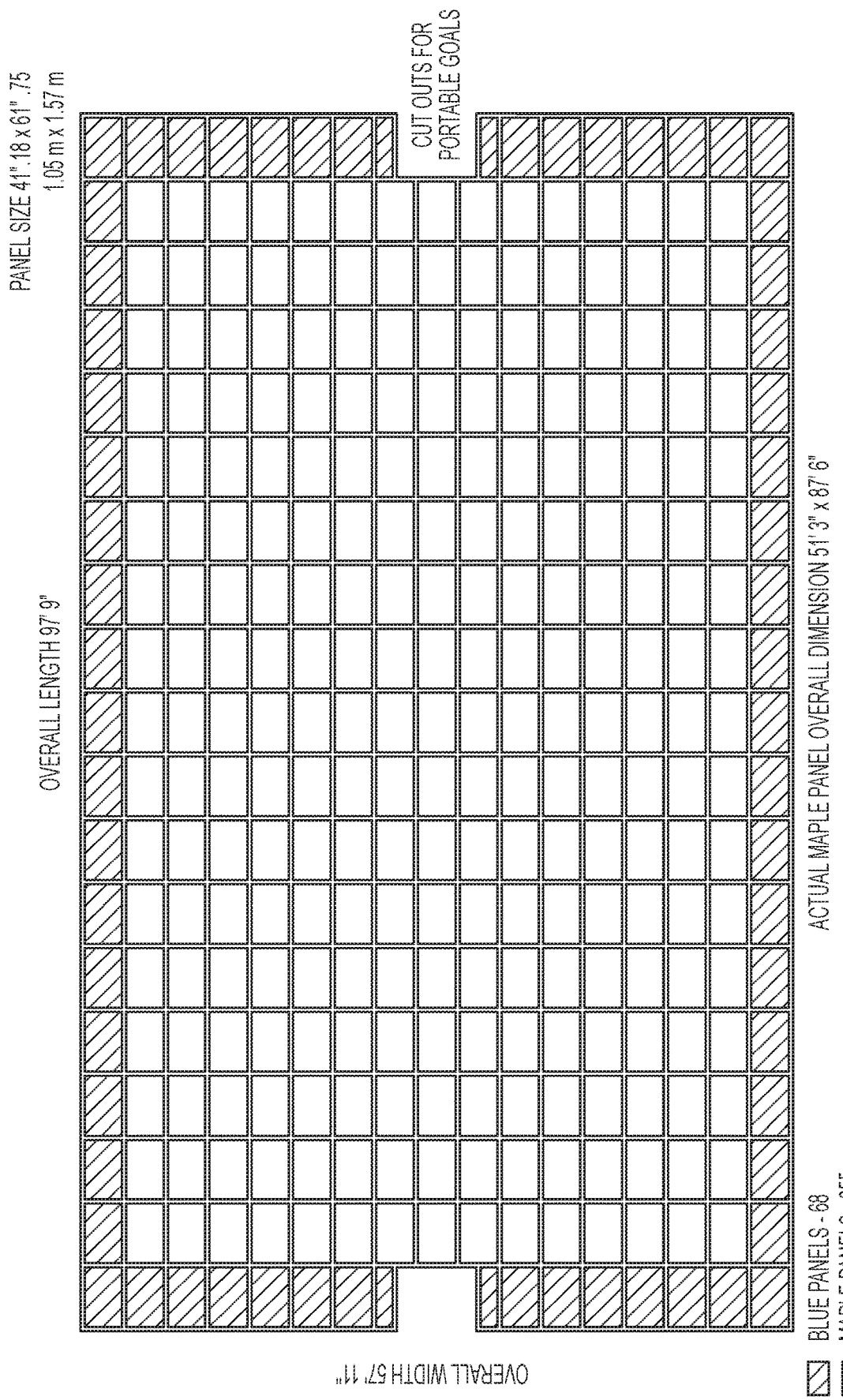
FIG. 6 illustrates an example basketball court layout created using floor panels in accordance with some embodiments of the present invention.
Figure 7:
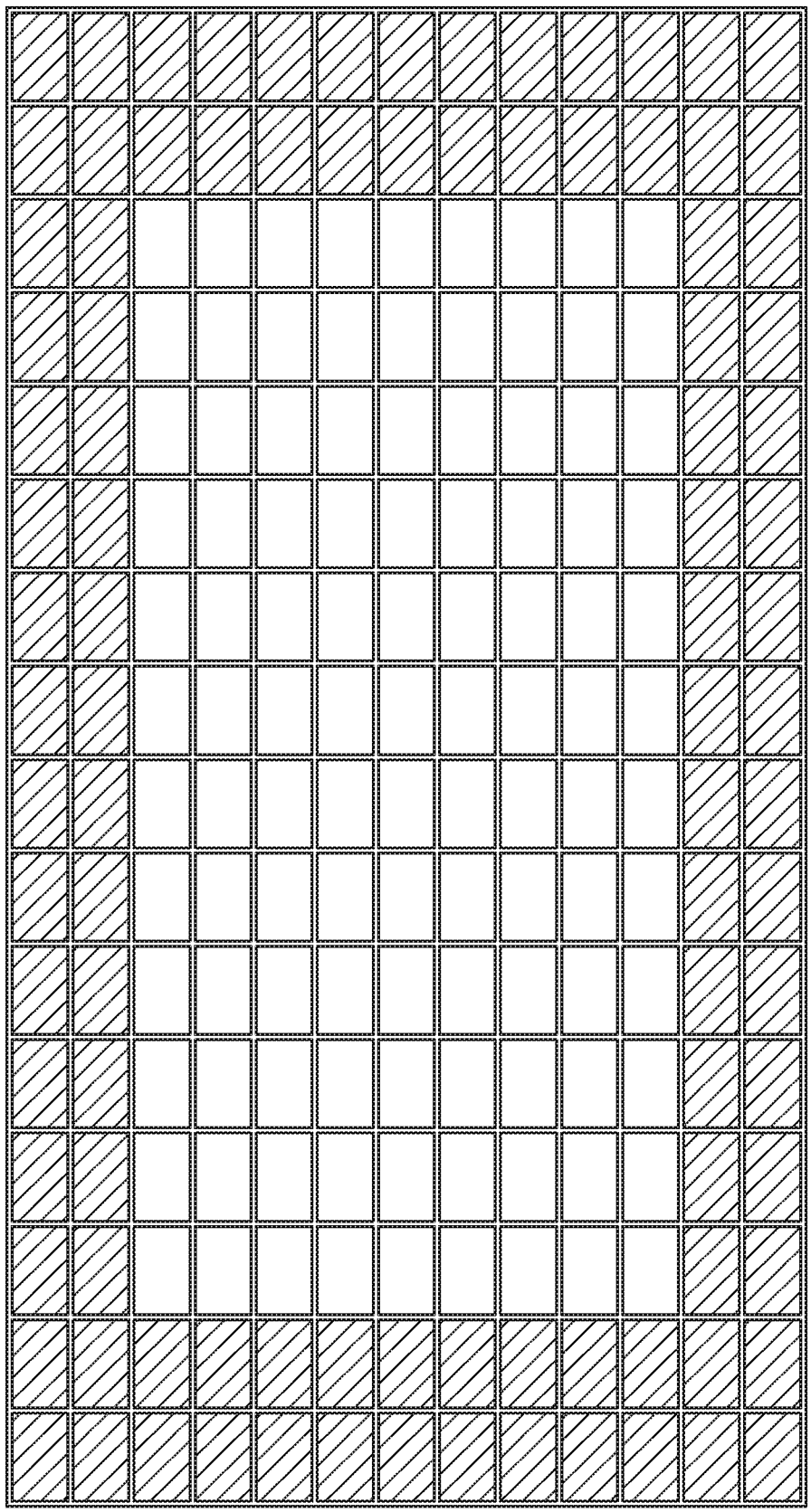
FIG. 7 illustrates an example volleyball court layout created using floor panels in accordance with some embodiments of the present invention.

The floor panel comprising the polypropylene foam pad (pad/underlayment may be comprised of alternative composition with similar performance properties) and the PVC tile is portable and a plurality of such panels may be carried to and installed in places where a sports floor is needed. The floor panel may weigh approximately 26 lbs. or less and have a density approximately 4.6 lb/ft$^3$. The floor panel may have a different weight and/or a different density depending on the materials used to manufacture the floor panel. The sports floor (complete system) may be used for a basketball court, a volleyball court, a handball court, other games, or other fitness activities whether they are recreational or competitive. FIG. 5 illustrates an example real basketball court built with the floor panels. FIGS. 6-7 illustrate an example basketball court layout and an example volleyball court layout created using the floor panels, respectively. The laminated surface may be modified to accommodate specific activities. The floor panel can be made for indoor use. The panel is installed on the ground or an installation surface with the polypropylene foam pad being closer to or touching the ground or installation surface and with the PVC tile or other tile on top being exposed to foot traffic. The complete floor panel's surface meets certain requirements such as coefficient of friction and shock absorbency standards specified for organized sports such as professional, college, high school basketball, volleyball, squash, or other sports. The floor panel or the sports floor can be designed with multi-purpose play or fitness in mind to accommodate diverse activities.

The floor panels may be used in different types of venues such as convention centers, Amateur Athletic Unions (AAU), ice rinks, fitness or aerobic centers, health clubs, and/or other private or public ("public" would be defined as federal, state, county, city, or local municipalities) sports and fitness dedicated facilities. The predominant industry wide floor panels are generally flat surfaces or leveled surfaces that do not have the shock absorbency or performance needs for the sport that it is to be played on a temporary basis (e.g., a weekend tournament or other short term events). The floor panels are designed to be easily and quickly installed and removed. The floor panels are structures to be arranged such that the panels are fitted tightly in order to have little or no gaps between the panels (so that seams do not affect game play such as balls bouncing erratically).

The floor panels provide a prefabricated sports surface with wood flooring design and slightly textured embossed surface. The flooring design and the surface texture may be modified for specific needs if required (e.g., wood grain appearance, solid colors, multiple colors, varying texture, color, print, and/or pattern, etc.). The flooring design and the embossed surface are formed on the tile of the floor panel and they should match across the tile. The printing of wood design should closely resemble the standard wood strip flooring in size, color, board length, and grain appearance. The wood design, for example, is protected by a clear layer of PVC and a factory applied UV cured urethane treatment formed on the tile. The floor panel can further incorporate intermediate layers that can be fortified with a non-woven fiberglass grid for increased dimensional stability.

Preferably, each panel involves a single pad and a single tile that are glued together with intermediate layers or other functionally similar or different component layers. The single pad and the single tile may also be glued together without such layers. The single pad and the single tile may also be glued together such that they physically contact each other. Each panel also includes male and female fastening mechanisms to interlock adjacent panels.

The floor panel creates a sports floor that has a higher force reduction compared to some existing floor panels or sports floors and that produces desired ball bouncing, friction, and vertical deformation.

The words "may" and "can" are used in the present description to indicate that this is one embodiment but the description should not be understood to be the only embodiment.

Exemplary floor panels are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention. Applications of the technology to other fields are also contemplated.

It should be understood that combinations of described features or steps are contemplated even if they are not described directly together or not in the same context.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An indoor portable floor panel for forming a sports floor for sports activity, comprising:
    a foam pad made of polypropylene or expanded polypropylene and including a plurality of male fastening mechanisms and a plurality of female fastening mechanisms, wherein a first set of the mechanisms is on one side and another set of the mechanisms is on an adjacent side pad and is adapted to be assembled and disassembled with a plurality of adjacent panels at sporting events, and wherein each of the plurality of male fastening mechanisms is configured to be vertically inserted into one of the plurality of female fastening mechanisms;
    a PVC tile attached to the foam pad and exposed to foot traffic; wherein the PVC tile further includes a clear layer of PVC and a UV cured urethane treatment; wherein the floor panel further comprises intermediate layers that include a non-woven fiberglass layer
    wherein the floor panel is configured to be installed on an installation surface and interconnect with additional floor panels via the male and female fastening mechanisms to form a sports floor for a sports activity, wherein interconnections between the floor panel and the additional panels have no gaps or gaps small enough without interfering the sports activity; and
    wherein the floor panel is further configured to be removable from the installation surface by disengaging the male and female fastening mechanisms interconnected with the additional floor panels; and
    wherein the floor panel exhibits a level of firmness that is the same or firmer than that of a wood floor strip.

2. The floor panel of claim 1, wherein the PVC tile is glued to the foam pad.

3. The floor panel of claim 1, wherein the floor panel is configured to be installed on the installation surface without applying adhesive and cement between the floor panel and the installation surface.

4. The floor panel of claim 1, wherein the floor panel is configured to be installed on the installation surface without employing a fastener to fix the floor panel to the installation surface.

5. The floor panel of claim 1, wherein the floor panel exhibits a force reduction above 50% per testing method found within EN 14904 or ASTM F2772.

6. The floor panel of claim 1, wherein the foam pad exhibits a force reduction above 50% per testing method found within EN 14904 or ASTM F2772.

7. The floor panel of claim 1, wherein the floor panel weighs approximately 26 lbs or less.

8. The floor panel of claim 1, wherein the floor panel has a density of approximately 4.6 lb/ft3.

9. The floor panel of claim 1, wherein the floor panel is further configured to be solid and impermeable.

10. The floor panel of claim 1, wherein the PVC tile further includes a flooring design and an embossed surface, wherein the flooring design resembles standard wood strip flooring in size, color, board length, and grain appearance.

11. The floor panel of claim 1, wherein the PVC tile is in physical contact with the foam pad.

12. The floor panel of claim 1, wherein the foam pad serves as an underlayment or shock absorbency pad of the floor panel.

13. The floor panel of claim 1, wherein the PVC tile has a coefficient of friction that meets coefficient of friction requirement of the sports activity.

14. The floor panel of claim 1, wherein the floor panel has a shock absorbency that meets shock absorbency requirement of the sports activity.

15. The floor panel of claim 1, wherein the male and female fastening mechanisms are disposed on the perimeter of the foam pad.

16. The floor panel of claim 1, wherein the PVC tile includes polyvinyl chloride material and the polyvinyl chloride material is exposed to foot traffic.

17. The floor panel of claim 16, wherein the PVC tile is in physical contact with the foam pad.

* * * * *